July 28, 1970  G. I. REX  3,521,832
AUTOMATIC LOCKING DEVICE FOR SAFETY BELTS
Filed Feb. 5, 1968  5 Sheets-Sheet 2

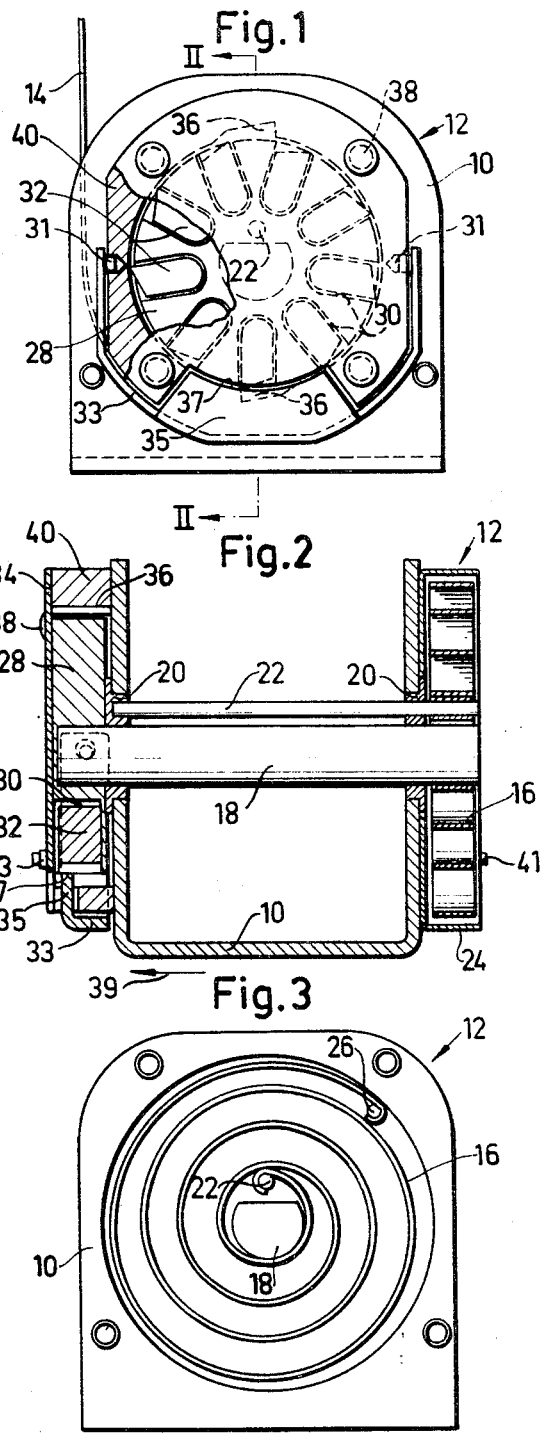

Inventor:
Gert Ingmar Rex
By
Attorney

July 28, 1970  G. I. REX  3,521,832
AUTOMATIC LOCKING DEVICE FOR SAFETY BELTS
Filed Feb. 5, 1968  5 Sheets-Sheet 4

Inventor:
Gert Ingmar Rex
By B. Schlesinger
Attorney

July 28, 1970 G. I. REX 3,521,832
AUTOMATIC LOCKING DEVICE FOR SAFETY BELTS
Filed Feb. 5, 1968 5 Sheets-Sheet 5

Inventor.
Gert Ingmar Rex
By: [signature]
Attorney

United States Patent Office 3,521,832
Patented July 28, 1970

3,521,832
AUTOMATIC LOCKING DEVICE FOR SAFETY BELTS
Gert Ingmar Rex, Halmstad, Sweden, assignor to AB Autoindustri, Halmstad, Sweden, a corporation of Sweden
Filed Feb. 5, 1968, Ser. No. 702,999
Claims priority, application Sweden, Feb. 10, 1967, 1,933/67; May 18, 1967, 6,997/67; Nov. 14, 1967, 15,646/67
Int. Cl. B65h 75/48
U.S. Cl. 242—107.4
17 Claims

ABSTRACT OF THE DISCLOSURE

A safety belt is wound about a spring-loaded shaft in a housing secured to a vehicle so that the shaft extends parallel to the direction of travel of the vehicle. A plurality of pawls are radially slidable in spaced recesses formed in the periphery of a drum that is attached to one end of the shaft for rotation in a stationary ring. An inertia-responsive member pivotal on the ring about an axis transverse to the shaft has a projection which normally extends between the drum and ring to prevent a pawl from dropping into locking engagement with a notch formed in the ring. When the vehicle decelerates in excess of about .2 $g$, the member pivots to reelase the pawl and lock the belt. Alternatively, when the shaft and drum are accelerated above about .6 $g$ by sudden withdrawal of the belt from the housing, centrifugal force causes at least one pawl to shift radially outwardly into locking engagement with another notch formed in the bore of the ring above the drum.

---

This invention relates to an automatic locking device for safety belts.

More particularly this invention relates to an automatic locking device for a safety or seat belt intended to retain person in a vehicle and having a strap windable on a shaft rotatably mounted in a casing by means of a spring.

One main object of the invention is to provide a locking device of the type set forth which permits the person retained by the belt to perform relatively slow movements in normal manner, for example for tightening of a hand brake, the person, however, being firmly reltained by the belt on rapid movements of the person in relation to his or her seat in the vehicle or on rapid deceleration of the vehicle. The relative movement between the locking device and the belt thus permitted is, according to a main feature of the invention determined, so that the belt can be drawn out from the locking device to be applied around a person, for example, with normal speed so that procedure does not, because of its slowness, cause any feeling of impatience. The locking device, however, becoming operative at a very early stage upon considerable change of speed of the vehicle, such as on a rapid deceleration or in case of a collision.

Another object of the invention is to provide safety belt locking device which becomes operative at dangerous or more considerable or rapid changes in the speed of the vehicle, not only in the direction of drive but also in a lateral direction.

Still another object of the invention is to provide a locking device which, in addition to its capacity of producing a locking effect against undesired drawing out of the belt caused by relatively small active forces, affords a maximum of security that the various movable parts of the locking device after an operative locking cycle return to their original positions.

Still a further object of the invention is to provide a safety belt locking device operative to actuate locking bodies in the device partly by utilization of contrifugal force for limiting the freedom of movement of the belt and partly by means of elements responsive to changes of the speed of the vehicle.

Further objects and advantages of the invention will become apparent from the following description, considered in connection with the accompanying drawings which form part of this specification and of which:

FIG. 1 is an end view of an automatic locking device for safety belts constructed according to the invention and illustrated with protective end caps removed and some portions broken away.

FIG. 2 is a sectional view following line II—II of FIG. 1 with the belt and a spiral spring for the winding up thereof removed.

FIG. 3 is an end view of the locking device shown in FIG. 1 but seen from the opposite direction.

In the various embodiments equivalent parts have been designated by the same reference numerals.

Figure 4:
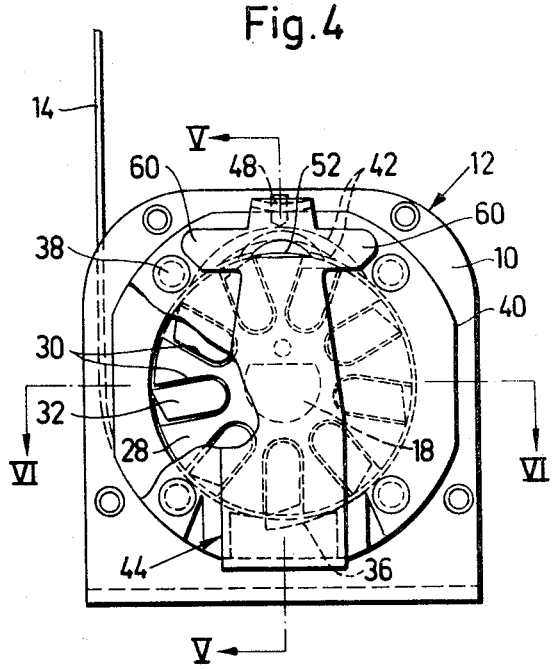
FIG. 4 is an end view of an automatic locking device according to another embodiment of the invention and illustrated with end protection caps removed and certain portion broken away.

Referring now to the embodiment shown in FIGS. 1–3, reference numeral 10 denotes a U-shaped casing for a locking device generally denoted 12 and destined for a safety belt 14. The safety belt consists of a band or strap which in known manner is wound about a shaft 18 by means of a spiral spring member 16. The shaft is mounted in spaced relation from its ends in bearing discs or bushings 20 rotatably mounted in recesses formed in the casing 10. Said discs 20 further carry a rod 22 positioned in spaced relation and parallel to the shaft 18, and between said discs defining an interior attachment for the inner end of the strap 14, and extending outside the one disc 20 to provide an attachment for the inner end of spiral spring member 16. Said spiral spring member is housed in a bowl-shaped case 24 which is rigidly secured by welding, onto one end of the casing 10 and which is provided with an opening through which the outer end of the spring member 16 projects to an attachment 26 for the same (FIG. 3).

A lock box 28 having the shape of a circular disc is secured to that end portion of the shaft 18 which is located opposite to the end portion supporting the spring member 16 and which extends beyond the adjacent bushing 20 and, consequently, projects outside the casing 10. Said lock box is formed with peripherally evenly spaced radial recesses 30, each intended to slidingly receive one pawl member 32, each operating in the manner of pistons or plungers. The recesses 30 open outwardly in the axial direction of the box but are covered by a cover plate 34 which assists in the guiding of the pawl members and which is retained on the casing by means of rivets 38.

As will be seen best from FIG. 1, the pawl members or bodies 32 are bevelled at their outer end portions, each edge portion formed in this way being intended to cooperate with at least one catch or ratchet recess 36 formed in the inner peripheral surface of an annular element 40 rigidly attached to the casing 10 by suitable means, such as the above-mentioned rivets 38, and surrounding the lock box 28. In the present case, two catches 36 are located diametrically opposite one another and formed so that only in one direction of rotation of the box 28 can they be engaged by the pawl bodies 32.

Those pawl bodies 32 which are positioned above a horizontal level through the shaft 18 are normally actuated by their own weight to a retracted position within the recesses 30, whereas the bodies below said level for the same reason tend to slide out from said recesses to locking engagement with the lower catch 36. This last-mentioned movement is, however, according to the invention, intended to take place only, when the vehicle to which the locking device is attached, is instantaneously decelerated, such as in case of an accident. To obtain this result, a yoke or inertia responsive swingable member 33 of substantially semi-circular shape is mounted in tap bearings 31 so as to be pivotable about an axis extending perpendicularly to the shaft 18; and it lies peripherally outside the lower half of the annular element 40. Said yoke 33 has a lower arcuate portion 35 with an inner arcuate surface 37 extending beneath the outer peripheral face of the box 28, and positioned in a recess in the outer end surface of the annular element 40 in front of the lower catch 36 to such a depth that, when said surface 37 of the portion 35 is in its operative position as shown in the drawings it prevents the pawl bodies 32, during rotation of the shaft 18 as the belt is unwound from the shaft, from sliding outwardly to locking position in engagement with the lower catch 36. However a rapid deceleration of the vehicle in the direction of drive indicated by the arrow 39 in FIG. 2, will cause yoke 33 to pivot outwardly (toward the left in FIG. 3) thereby releasing the bodies to slide into locking position.

With the structure thus described the belt strap 14, upon a relatively slow pulling or withdrawal thereof, from the shaft 18, leaves the pawl bodies 32 non-actuated, but on a rapid pulling movement the centrifugal action on the upper pawl bodies created thereby brings one of them into locking position in the upper catch 36, one of the lower pawl bodies 32 also being caused immediately to engage the lower catch as soon as the vehicle in which the locking device is mounted, is subjected to rapid retardation.

As is best seen in FIG. 2, the casing 10 is provided with spacing rivets 41 and 43 for the purpose of securing thereto end protection caps not shown in the drawings.

Figure 5:
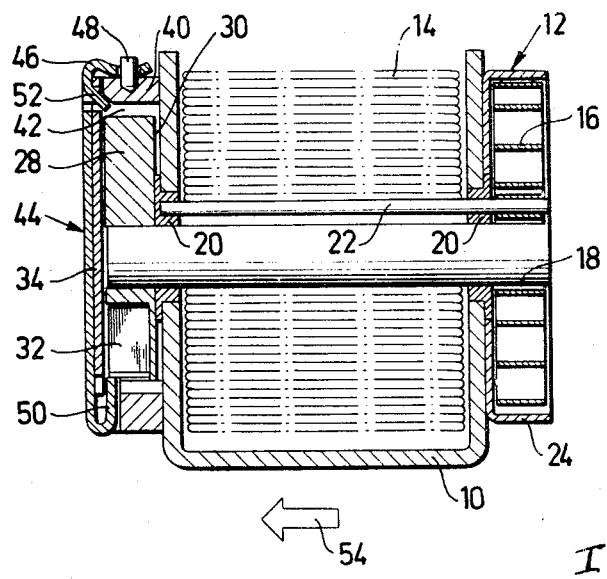
FIG. 5 is a sectional view following line V—V of FIG. 4.
Figure 6:
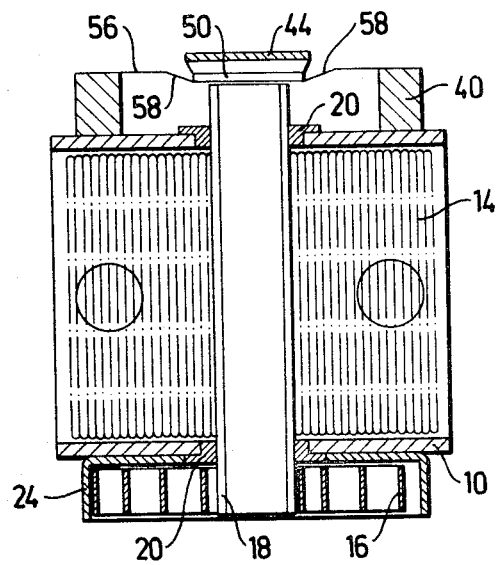
FIG. 6 is a sectional view following line VI—VI of FIG. 4 with a guide case for the locking device removed.

The embodiment presented in FIGS. 4 to 6 differs from the preceding one substantially by having one recess or catch 36 only, which is formed at the bottom of the inner peripheral surface of the annular element 40. The catch 36, which with the casing 10 is fixedly mounted in the vehicle, is located substantially perpendicularly below the shaft 18 and is formed in the same manner as in the preceding embodiment so that only in one direction of rotation of the box 28 can catch 36 be engaged by a pawl body 32 when these bodies, due to actuation by gravity, are displaced outwardly.

The inner face of the annular element 40 diametrically opposite to the catch 36 is formed with a radially outwardly extending notch 42 having smooth transition portions for reasons to be explained below and permitting temporary outward movement of one of the pawl bodies 32 when, upon a pull on the belt strap 14 and the consequent rotation of the box 28 about the shaft 18, these bodies are displaced outwardly by the centrifugal force during their passage past the notch 42.

This temporary outward movement of a pawl body 32 has for its purpose to actuate a pivotably inertia-responsive release member generally denoted 44 and having a substantially strip shape. This member, which extends transversally to the shaft 18, has at its top an angularly bend end portion 46 having its downwardly bent side convex for contact with a plane seat formed on the upper surface of the annular element 40 and for a swinging movement on said seat about a pivot 48. This pivot is formed so that the member 44 can swing both outwardly and laterally causing a locking projection or head 50 provided at the lower end of the member 44 by an upwardly bent portion thereof to release the pawl body 32 (FIG. 5) located in front thereof and of the catch 36, which body in the non-actuated condition of the member 40 has been retained by the head 50 in retracted position within the box 28 against the action of gravity. This release will result in the pawl body sliding down to engagement with the catch 36. The movement of the release member 44 to this releasing position is obtained, as already mentioned before, by the outwardly directed movement of another pawl body having diametrically opposite location during its passage past the notch 42, where it engages a shoulder 52 projecting from the inner face of the member 44. This shoulder, which in the illustrated embodiment is constituted by a curved tap embossed in the material, forms an arcuate track over which each pawl body slides during its travel through the notch 52, to effect the outwardly directed pivoting of the release member 44, and thus causing the locking device to become operative.

This pivoting movement of the release member 44 governed by a pawl body and causing subsequent locking of the belt 14 is brought about when the movement of the belt has been accelerated to a predetermined speed due to a relative movement between the vehicle to which the locking device is attached, and the user of the safety belt, which movement may be caused intentionally or non-intentionally by an accident, for example.

It is, however, also possible upon sudden braking of a vehicle, for instance, to actuate the member 44 to take a position releasing the lower locking pawl body 32, see FIG. 5, where the outlined arrow 54 indicates the direction of drive of the vehicle. When the vehicle is decelerated, the lower end of the member 44 will continue in a part-rotational or pivoting movement in the said direction of drive whereby the pawl body located therebehind is released for engagement with the catch 36 whereby the belt 14 is blocked against further movement.

Still another possibility of blocking the belt 14 is inherent to the present invention by the structure best shown in FIG. 6. The annular element 40 has on its end edge facing the member 44 a guiding surface 56 which is in contact with the inner face of the projection or head 50 of the element 40. In the position shown in FIG. 6, said head retains the adjacent pawl body 32 in its upper or retracted position, and is positioned in the deepest or most recessed central portion of the guide surface 56.

If now the vehicle, in which the locking device of the invention is mounted, is subjected to a sufficiently accelerated lateral movement (compare FIG. 5) the member 44 is forced to perform a lateral movement causing the head 50 to slide upwardly on one of the two outwardly ascending face portions 58 located on either side of said central portion, and the member 44 is swung outwardly which permits the adjacent pawl body 32 to be released and the belt 14 is thus locked.

It may be mentioned that range of the swinging movements of the member 44 is very limited and suitably confined between 11° and 17°. The member 44 may have, as is best seen from FIG. 4, laterally projecting wing-shaped prolongations 60 assisting in the stabilization of the movements thereof.

If desired, the shoulder 52 can be eliminated and its function instead be fulfilled by an interior recess or catch formed in the upper portion of the annular element 40, said catch corresponding to the upper catch 36 in the preceding embodiment. On rapid withdrawal of the belt 14 from the shaft, one pawl body 32 will be centrifuged to engage said catch whereby the belt shaft is locked.

Figure 7:
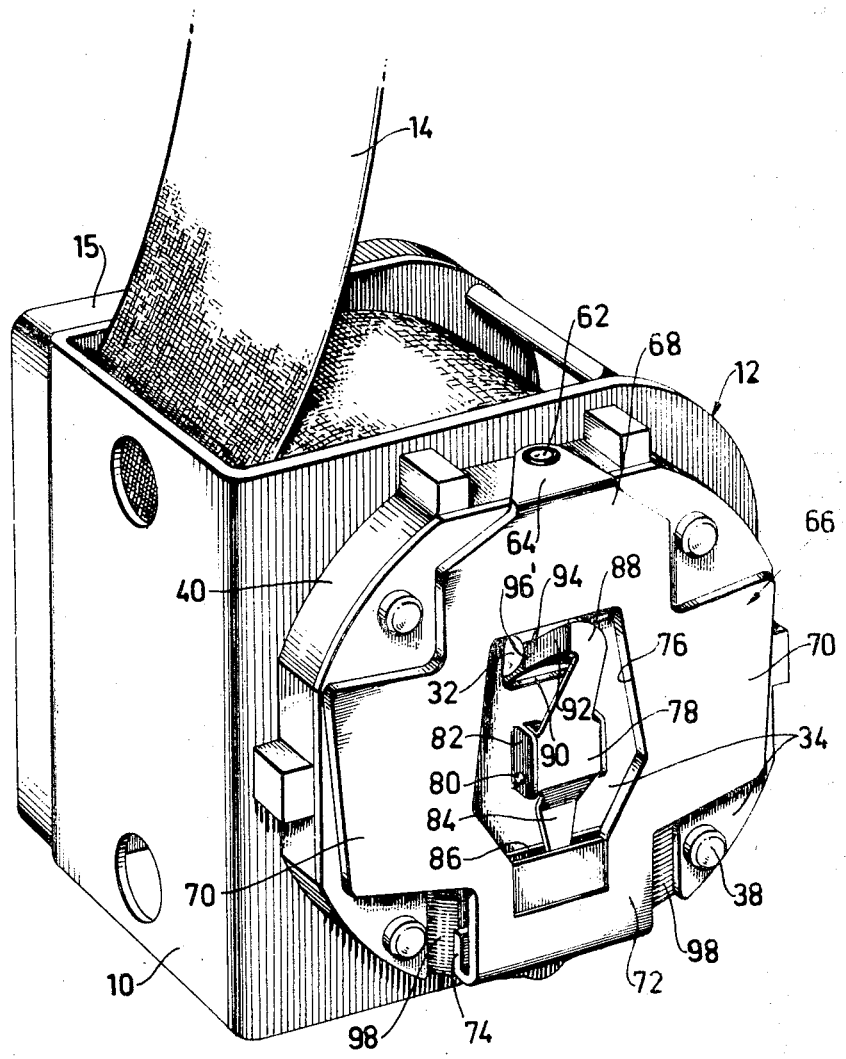
FIG. 7 is a perspective view of an automatic locking device embodying a third embodiment of the invention with an end protection cap belonging thereto removed.
Figure 8:
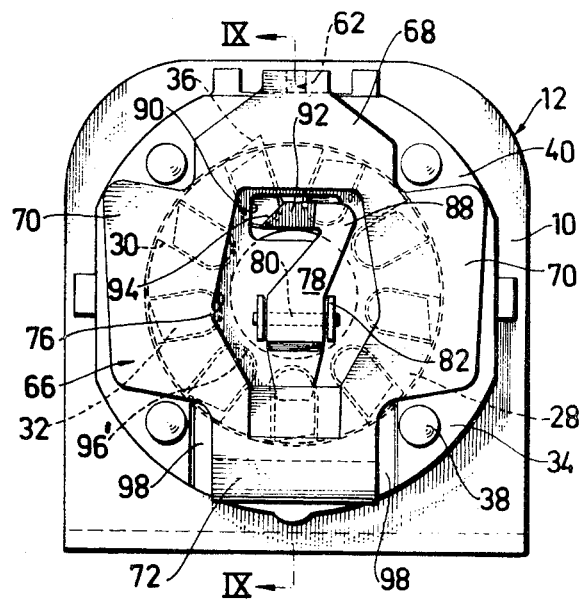
FIG. 8 is an end view from the right of the locking device presented in the last-mentioned figure.
Figure 9:
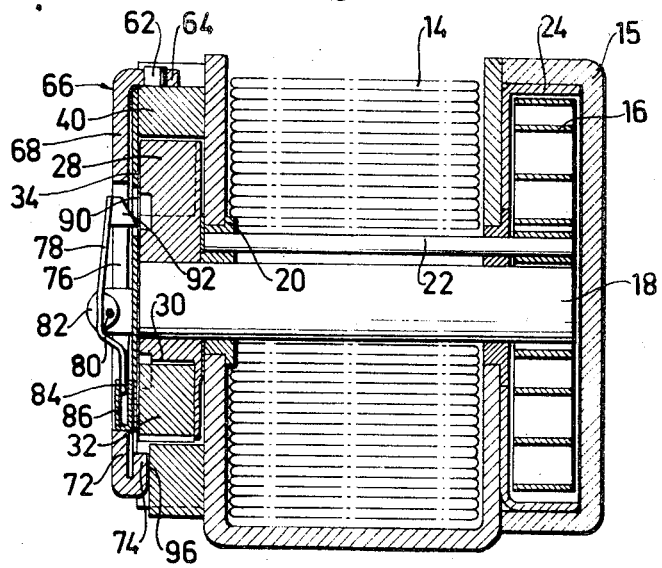
FIG. 9 is a partial sectional view following line IX—IX of FIG. 8.

In the embodiment according to FIGS. 7–9, a radially projecting pin 62 is mounted vertically above the shaft 18 on the upper outer face of the annular element 40. Suspended from said pin by means of a lug 64 having an opening for said pin is a flat inertia-responsive release member 66. Said member normally extends along the outer face of the cover plate 34 and thus in a plane transverse to the shaft 18 and is formed with an upper prolongation 68 from which the lug 64 projects laterally. It is also formed with two laterally projecting stabilizing wing portions 70 and a lower prolongation 72 which adjacent its lower edge is bent inwardly to form a head 74, the purpose of which will be described hereinafter in more detail.

The member 66 has also a central opening 76 leaving space for a swingable arm 78 formed as a two-armed lever, which is pivoted intermediate its ends on a shaft 80 which in the operative position of the locking device substantially extends horizontally, is mounted between two lugs 82 projecting in mutually spaced relationship from the central portion of the cover plate 34.

The lower end 84 of the swingable arm 78 enters into a groove 86 formed between the legs of a U-shaped bracket that is secured to the lower edge of the opening 76 in the member 66. The end 84 of the arm 78 and the groove 86 are intended for cooperation in such manner that relative movement between said arm end 84 and said groove 86 is possible when the release element 66 is swung laterally from its position indicated in FIG. 8; whereas a swinging outward movement of the element 66 causes a corresponding swinging outward movement of the arm end 84.

As is easily understood this swinging outward movement causes a corresponding movement of the opposite end 88 of the arm 78 in a direction towards the pawl bodies 32 to cooperate with them through an opening 90 formed in the cover plate 34. For this purpose the arm 88 is in the present embodiment formed with a laterally extending or inwardly bent end portion 92 terminating in a bevelled edge face 94 which may, after an insignificant turning movement of the box 28, engage the inner rounded edge 96' of that pawl body 32 which is adjacent the catch or notch 36 whereby said pawl body upon a further small turning movement of the box 28 is caused to engage said notch 36 and to block said box against continued movement and thereby any further withdrawal of the belt 14.

The shoulder 74 mentioned earlier and formed at the lower end of the lower prolongation 72 of the release element 66 rests, as long as the element is not actuated to its emergency blocking position, against a guide face 96 forming the bottom of a cavity formed in the outer lateral face of the annular element 40 and continuing on either side of the shoulder 74 in an outwardly inclined relationship to the just-mentioned side lateral face so as to form inclined guide surfaces 98 engageable with the shoulder 74 when the release member 66 is caused to swing to either one or the other side in the plane of FIG. 8.

The automatic locking device described hereinbefore is intended to be mounted in a vehicle such as a car with the inertia-responses release member depending in a substantially vertical plane and positioned at the front, seen in the direction of drive which in the present case means at the left-hand in FIG. 1.

The properties of the locking device shall obviously primarily be such that on deceleration of the vehicle it locks the belt 14 upon initial withdrawal of the belt so as to prevent the user from being thrown ahead and becoming injured. In addition, the locking device is also devised so that it is easy to handle and to control. This is because the pawl bodies 32 are dimensioned and disposed so that any radial outwardly directed movement thereof caused by centrifugal force is not, by itself, sufficient to cause locking of the belt until the acceleration of withdrawal of the belt 14 has reached a predetermined suitable value, such as 0.6 g. for example. This permits the user rapidly to withdraw the belt to bring it into its position of use around his or her waist and after such application of the belt permits the user to lean forwards without causing a locking of the belt. Further, by a more rapid withdrawal of the belt the user can make sure that the pawl bodies are prepared to function correctly should the vehicle, by an accident for example, be vigorously decelerated and the belt thereby, due to the movement ahead of the user, be withdrawn with an acceleration in excess of the 0.6 g. stated above as example.

On deceleration of the vehicle, and in particular when combined with a lateral impact thereon as in case of collision, a further cycle is started by the release member 66, either due to its inertia on deceleration or by said lateral impact transverse to the direction in which the vehicle is travelling. By the collaboration of the projection 74 with one of the inclined guide faces 98 said member 66 is caused to swing outwardly. This causes the lower end 84 of the swingable arm 78 engaging the member 66 to be swung outwardly whereby the upper end 88 of the arm is moved inwardly so that the bevelled guide edge 94 of the inwardly bent portion 92 of the arm end is brought to guiding contact with the inner end edge 96' of the most adjacent pawl body 32. This will in turn cause said pawl body 32, upon an insignificant rotating movement of the box 28 caused, for example, by the forward movement of the user as the vehicle decelerates, to be guided radially outwardly so as to engage the catch 36, thereby almost instantaneously locking the belt 14 against further withdrawal. A deceleration of the vehicle of a magnitude of 0.2g, for example, can be sufficient to start this cycle.

The locking device 12 may be secured adjacent the floor of the car on that side of a seat which faces the door. Here, when in use, the belt 14 may pass unobstructed to a lug or deflecting fitting or fixture on the same side of the seat but on a higher level, such as that of the shoulder of the user, its free end being attached to a fixture, not illustrated. This implies that the belt when not in use is wound up inside the device to its maximum length so that its free portion with double straight parts extends upwardly to said lug and back to the fastening place on the bottom so that said belt portions in no manner constitute an obstacle to persons entering or leaving the car through the door even if the same door is utilized for the passengers of the front seat and the back seats. On the opposite side of the seat, a coupling of the type shown at 12 in the U.S. Pat. No. 3,227,490 to R. H. Svensson can be anchored on the bottom, if necessary by means of a shorter belt portion. Said coupling is provided with an arm or similar member which opens totally so that the free end of belt 14 without any additional locking or attaching fittings can be seized by the coupling. The length of the portion of the belt 14 which must be withdrawn will thereby automatically become adapted to the size of the body of the person occupying the seat.

Thus the automatic locking device can be mounted in the vehicle so as to have the inertia-responsive release member 66 (FIGS. 7–9) facing rearwardly with respect to the direction of drive of the vehicle. In this case, said inertia-responsive member is pivotably mounted on the base part of the annular element 40, said member then being kept in a suitable angular position to the vertical plane by means of a weak spring member (not illustrated) and having its end opposite to its pivot point formed with a latch corresponding to the bent-in portion of the swinging arm 78 shown in the embodiment according to FIGS. 7 to 9, and provided with a corresponding guide edge 94 for collaboration with the guide edge 96' of one of the pawl bodies 32. As is easily understood on a deceleration of the vehicle the inertia-responsive release member will be forced against the action of said spring member to swing inwardly towards the annular element 40 and thereby in the same manner as described before produce the desired locking effect against withdrawal of the belt strap 14.

While several more or less specific embodiments of the invention have been shown and described, it is to be understood that this is for purpose of illustration only, and that the invention is not to be limited thereby, but its scope is to be determined by the appended claims.

What I claim is:

1. An automatic locking device for a safety belt intended to retain a person in a vehicle, comprising
   a housing fixed to the vehicle,
   a shaft rotatably mounted in said housing,
   a safety belt fastened at its inner end to said shaft and wound thereabout in said housing,
   a spring interposed between said housing and said shaft resiliently to resist the rotation of said shaft up withdrawal of said belt from said housing,
   a stationary catch positioned on said housing radially outwardly of said shaft,
   a member fixed to said shaft,
   movable pawl means mounted on said member for movement relative thereto into and out of engagement with said catch, and urged by centrifugal force outwardly toward said catch upon acceleration of said shaft in one direction in response to sudden withdrawal of said belt from said housing, and
   an inertia-responsive member mounted on said housing for movement relative thereto independently of said pawl means, and normally disposed in an operative position to hold said pawl means disengaged from said catch when said vehicle is at rest, said inertia-responsive member being responsive to relatively slight changes in the speed of said vehicle to release said pawl means for engagement with said catch thereby to lock said shaft against rotation in said one direction.

2. An automatic locking device as defined in claim 1, including means mounting said inertia-responsive member on said housing for pivotal movement between its operative and inoperative positions about a first axis transverse to the axis of said shaft.

3. An automatic locking device as defined in claim 2, wherein said inertia-responsive member has thereon a projection which extends between the first-named member and said catch, when said inertia-responsive member is in its operative position, and which is swung from between said inertia-responsive member and said catch to allow said pawl means to drop by gravity into engagement with said catch, when said inertia-responsive member is swung to its inoperative position.

4. An automatic locking device as defined in claim 3, wherein
   said pawl means comprises a plurality of pawl members slidably guided in angularly spaced recesses in the periphery of said first-named member for movement radially thereof, and
   said pawl members have on their radially outer ends inclined surfaces slidably engageable with said catch to maintain said pawl members disengaged from locking relation with said catch, when said shaft is rotated in a direction opposite to said one direction.

5. An automatic locking device as defined in claim 4, wherein said inertia-responsive member has thereon a second projection extending over the periphery of said first-named member and engageable by one of said pawl members to be forced thereby in a direction to swing said inertia-responsive member to its inoperative position, when the acceleration of said shaft exceeds a predetermined value in said one direction.

6. An automatic locking device as defined in claim 5, wherein
   a pin is fixed to said housing above said first-named member, and
   said inertia-responsive member comprises a flat plate having at its upper end a lateral extension pivotally mounted on said pin normally to suspend said plate in a generally vertical plane transverse to said shaft and having adjacent its lower end a further lateral extension defining the first-named projection.

7. An automatic locking device as defined in claim 6, wherein adjacent its upper end said flat plate has an inwardly directed arcuate portion overlying said first-named member and forming said second projection.

8. An automatic locking device as defined in claim 2, wherein
   said mounting means also supports said inertia-responsive member for pivotal movement about a second axis parallel to the axis of said shaft, and
   guide means is interposed between said inertia-responsive member and said housing and is operative, when said inertia-responsive member pivots about said second axis, to swing said inertia-responsive member between its operative and inoperative positions about said first axis.

9. An automatic locking device as claimed in claim 8, wherein
   said shaft is adapted to be mounted to extend parallel to the normal direction of travel of said vehicle, and
   said guide means comprises a pair of spaced guide surfaces on said housing inclined to the axis of said shaft and positioned to be engaged by said inertia-responsive member upon the swinging movement thereof about said second axis thereby to guide said inertia-responsive member out of its operative position upon sudden movement of the vehicle transverse to its normal direction of travel.

10. An automatic locking device as defined in claim 4, wherein said housing has at least one further stationary catch approximately diametrally opposite the first-named catch and positioned to have one of said pawl members moved into locking engagement therewith, when the acceleration of said shaft in said one direction exceeds a predetermined value.

11. An automatic locking device as defined in claim 10, wherein said inertia-responsive member has thereon further means movable from an inoperative to an operative position, upon movement of said inertia-responsive member to its inoperative position, to engage and urge said one of said pawl members radially outwardly toward locking engagement with said further catch.

12. An automatic locking device as defined in claim 11 wherein said further means comprises a pivotal arm operatively connected to said inertia-responsive member for movement therewith about said first axis and having on one end thereof a guide surface for engaging the inner end of said one pawl member, when said arm is moved to its operative position.

13. An automatic locking device as defined in claim 12, wherein said arm is a two-armed lever pivoted intermediate its ends on said housing and having its lower end in engagement with said inertia-responsive member normally to be held thereby in its inoperative position, and having on its upper end said guide surface.

14. An automatic locking device as defined in claim 13, wherein
   said lower end of said arm projects into a slot formed in said inertia-responsive member transverse to said shaft to permit relative movement between said arm and said inertia-responsive member in the longitudinal direction of said slot, and
   said inertia-responsive member, upon pivotal movement thereof about said first axis, is operative to pivot said arm in a direction to engage said guide surface with one of said pawl members.

15. An automatic locking device as defined in claim 14, wherein
   said inertia-responsive member is mounted also to pivot about a second axis parallel to said shaft,
   on its lower end said inertia-responsive member has a projection engageable in a recess defined by a pair of spaced guide surfaces on said housing, and
   said spaced guide surfaces are inclined surfaces for moving said inertia-responsive member to its inoperative position upon pivotal movement thereof in either direction about said second axis.

16. An automatic locking device for a safety belt adapted to retain a person in a vehicle comprising
 a housing secured to the vehicle and having therein a rotatable shaft and a stationary locking member,
 a spring-loaded belt wound on said rotatable shaft,
 a movable pawl member interposed between said shaft and said locking member,
 means mounting said pawl member for rotation together with said shaft, and for movement outwardly relative to the axis of said shaft upon acceleration thereof in one direction, and
 means including an inertia-responsive element interposed between said pawl member and said locking member for movement relative thereto, and operative upon rapid change of movement of the vehicle to cause said pawl member to be moved outwardly into locking engagement with said stationary locking member, partly as the result of the centrifugal force executed on said pawl member, and partly by the inertia of said inertia-responsive element.

17. An automatic locking device as claimed in claim 16, wherein said inertia-responsive element is positioned normally to lock said pawl member against outward movement, and is adapted at relatively small change in the speed of the vehicle to release said pawl member.

References Cited

UNITED STATES PATENTS

| | | | |
|---|---|---|---|
| 2,701,693 | 2/1955 | Nordmark et al. | 242—107.4 |
| 3,206,137 | 9/1965 | Snyderman | 242—107.4 |
| 3,214,218 | 10/1965 | Gill | 242—107.4 XR |
| 3,226,053 | 12/1965 | Petty | 242—107.4 |
| 3,240,510 | 3/1966 | Spouge | 242—107.4 XR |
| 3,341,250 | 9/1967 | Rasmussen. | |
| 3,397,849 | 8/1968 | Hansen | 242—107.4 |

FOREIGN PATENTS 211,626  3/1967  Sweden.

STANLEY N. GILREATH, Primary Examiner

W. H. SCHROEDER, Assistant Examiner